(12) United States Patent
Kim

(10) Patent No.: US 7,184,870 B2
(45) Date of Patent: Feb. 27, 2007

(54) METHOD FOR CONTROLLING EXPANSION OF AN AIR BAG

(75) Inventor: Hoon Kim, Gwangmyeong-si (KR)

(73) Assignee: KIA Motors Corporation, Seocho-Ku (KR)

( * ) Notice: Subject to any disclaimer, the term of this patent is extended or adjusted under 35 U.S.C. 154(b) by 67 days.

(21) Appl. No.: 10/440,210

(22) Filed: May 16, 2003

(65) Prior Publication Data
US 2003/0214123 A1  Nov. 20, 2003

(30) Foreign Application Priority Data
May 16, 2002 (KR) .............................. 2002-27189

(51) Int. Cl.
*B60R 21/32* (2006.01)
(52) U.S. Cl. .................. 701/45; 280/735; 180/282
(58) Field of Classification Search ............ 701/45–47; 280/735; 180/272, 282, 283, 284
See application file for complete search history.

(56) References Cited

U.S. PATENT DOCUMENTS

| | | | | |
|---|---|---|---|---|
| 5,229,943 A | * | 7/1993 | Eigler et al. ................ | 701/46 |
| 5,366,241 A | * | 11/1994 | Kithil ........................ | 280/735 |
| 5,394,326 A | * | 2/1995 | Liu ............................ | 701/46 |
| 5,497,327 A | * | 3/1996 | Takaya et al. ................ | 701/46 |
| 5,657,831 A | * | 8/1997 | Furui ......................... | 180/282 |
| 5,668,720 A | * | 9/1997 | Takahashi et al. .......... | 307/10.1 |
| 5,742,916 A | * | 4/1998 | Bischoff et al. ............. | 701/45 |
| 6,327,527 B1 | * | 12/2001 | Imai et al. .................. | 701/45 |
| 6,424,899 B2 | * | 7/2002 | Imai et al. .................. | 701/45 |

* cited by examiner

*Primary Examiner*—Gary Chin
(74) *Attorney, Agent, or Firm*—Morgan Lewis & Bockius LLP

(57) ABSTRACT

The method for expanding an air bag includes the steps of: detecting a variation of a deceleration of a vehicle during a vehicle collision and applying the detected deceleration signal to a microcomputer. Analyzing a collision waveform generated according to the deceleration signal and determining an impact degree of the vehicle. Temporarily stopping an operation of the deceleration detector at the microcomputer. Initializing an initial collision waveform while the operation of the deceleration detector is stopped, the initial collision waveform being inputted before the microcomputer stops the operation of the deceleration detector. Re-operating the deceleration detector at the microcomputer, detecting again a variation of the deceleration of the vehicle at the deceleration detector, and applying the newly detected deceleration signal to the microcomputer. When the collision waveform, generated according to the applied deceleration signal, reaches a set value, activate an air bag driving unit at the microcomputer.

10 Claims, 4 Drawing Sheets

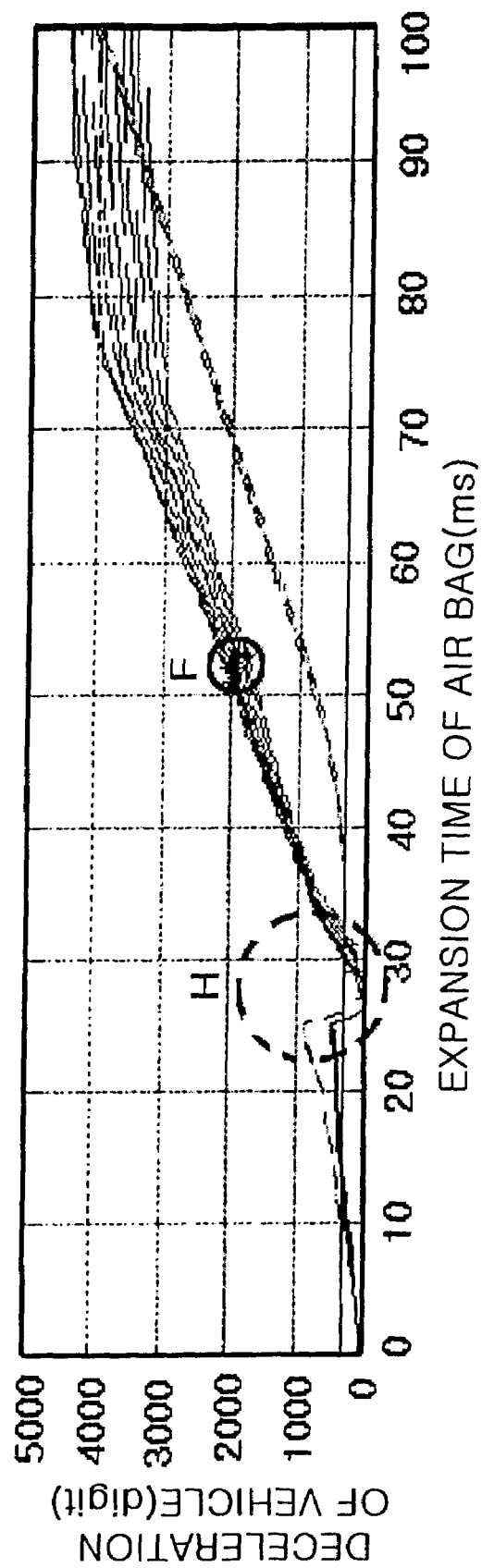

METHOD FOR CONTROLLING EXPANSION OF AN AIR BAG

FIELD OF THE INVENTION

Generally, the present invention relates to a method for improving the expansion of an air bag. More particularly the method controls the timing of the expansion of an air bag by controlling a collision waveform generated during a vehicle collision.

BACKGROUND OF THE INVENTION

Typically, air bag systems are employed in vehicles as a safety device for protecting the driver and passengers during a collision. Sensors, stimulated during vehicle collisions trigger the air bag to expand between a driver and a steering wheel and/or between a passenger and the instrument panel of the vehicle. Therefore, the impact of the collision is absorbed into the air bag, securing the safety of the driver and passenger.

During an accident or collision, a vehicle's speed decelerates. A deceleration detector detects the deceleration and provides a signal to a microcomputer. The microcomputer determines an impact degree of the vehicle according to the detected deceleration signal. The microcomputer analyzes the collision waveform generated during the collision. If the degree of the deceleration is more than a set value, an air bag driving unit is activated and explodes nitrogen gas, thereby, expanding the air bag.

One drawback of the typical air bag system is that the microcomputer operates the air bag driving unit using only the deceleration signal provided by the deceleration detector. Therefore, the typical air bag system does not consider deviation in different types of collisions or degrees of movement and a deformation degree of the vehicle from the collision. The deviation in collisions can actually affect an expansion time of the air bag, such that the air bag is expanded to early or too late. As a result, the driver and the passengers are subject to a dangerous condition when the deceleration reaches the maximum value.

Additionally, a required expansion time of the air bag, or required time to fire (RTTF), which is required for appropriate expansion of the air bag at the moment of the collision, is applied to the conventional air bag system. The RTTF is directly linked with the expansion of the air bag and is an important factor in the evaluation standard when the stability and performance of the air bag system are tested.

The following are generally applied to the test for evaluating the expansion performance of the air bag. A collision test in which a vehicle collides with a wall of 0° to 30° at a speed of 8 mph (mile per hour) to 35 mph. A collision test in which a vehicle collides with a pillar at a speed of 19 mph to 30 mph, and a test in which a vehicle is crushed under another vehicle (e.g., a truck or a large-sized bus).

In collision tests where a vehicle is collided head-on with a pillar at 19 mph the minimum expansion time of the air bag is roughly 53 ms (milliseconds), and a maximum expansion time of the air bag is roughly 82 ms. The RTTF has an actual standard time of 50.2 ms. Therefore, as is determined and shown by collision tests, the conventional air bag system has a large derivation in the air bag expansion time and can greatly exceed the RTTF.

In collision tests where a vehicle is collided with a truck or a large-sized bus at a speed of 20 mph and is crushed under the truck or the large-sized bus the minimum expansion time of the air bag is roughly 0 ms, and a maximum expansion time of the air bag is roughly 79 ms. The RTTF has an actual standard time of 48.7 ms. Therefore, as can be seen from the collision waveform measured in actual collision tests, the expansion time of the air bag according to the convention air bag system is greatly variable and unstable.

Therefore, it would be advantageous to have an air bag control system and method that deployed the air bag at the appropriate time in response to a variety of collisions.

SUMMARY OF THE INVENTION

In one embodiment of the present invention a method is provided for air bag expansion in which a detecting operation, of a deceleration detector, is temporarily stopped after the vehicle collision and an initially recognized collision waveform is initialized. Then, the deceleration detector re-operates and applies a newly detected deceleration to a microcomputer, thus reducing the expansion time of the air bag. Accordingly, the expansion time of the air bag is closer to the RTTF, such that a more stable expansion performance can be achieved.

A preferred embodiment of the present invention includes the steps of detecting a variation in deceleration of a vehicle during a collision, at a deceleration detector, and applying the detected deceleration signal to a microcomputer. A collision waveform is generated according to the deceleration signal and analyzed by the microcomputer to determine a degree of impact upon the vehicle. Next, the operation of the deceleration detector is temporarily stopped while the collision waveform is increasing. The initial collision waveform, which was input prior to stopping operation of the deceleration detector, is initialized when the operation of the deceleration detector is stopped. The deceleration detector is then re-operated by the microcomputer and a variation of the deceleration of the vehicle at the deceleration detector is sensed. Thereby, the newly detected deceleration signal is applied to the microcomputer. Also, when the collision waveform generated according to the applied deceleration signal reaches a set value the air bag driving unit at the microcomputer is operated to expand the air bag. Therefore, the overall expansion time of the air bag is reduced and approaches the required time to fire (RTTF).

In a further preferred embodiment, the step of analyzing a collision waveform further includes a step of determining whether or not the collision waveform reaches a set time range after a predetermined time elapses from a moment when the microcomputer starts to recognize the initial collision waveform.

Preferably, the step of temporarily stopping the deceleration detector is carried out when the collision waveform reaches the set time range after the microcomputer starts to recognize the collision waveform.

The step of re-operating the deceleration detector is carried out when the deceleration of the vehicle reaches 0 velocity digit. It is desirable that the set time range be 20 ms to 30 ms.

In another preferred embodiment the method for controlling expansion of an air bag comprises detecting an initial deceleration signal of a vehicle from a deceleration detector during a vehicle collision and applying the initial deceleration signal to a microcomputer. The method also includes analyzing the initial deceleration signal in the microcomputer and stopping the deceleration detector from detecting the initial deceleration signal. Next, the method clears the initial deceleration signal from the microcomputer and re-operates the deceleration detector to generate a new deceleration signal. The new signal is applied to the microcomputer and analyzed. Following analysis, the air bag is deployed if the new deceleration signal reaches a set value.

Also, preferably, the deceleration detector is re-operated if the deceleration of the vehicle reaches a zero (0) velocity according to the initialization of the deceleration signal.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings:

FIG. 4 is a graph showing another result obtained when another embodiment of the method of the present invention is carried out.

DETAILED DESCRIPTION OF THE PREFERRED EMBODIMENTS

Figure 1:
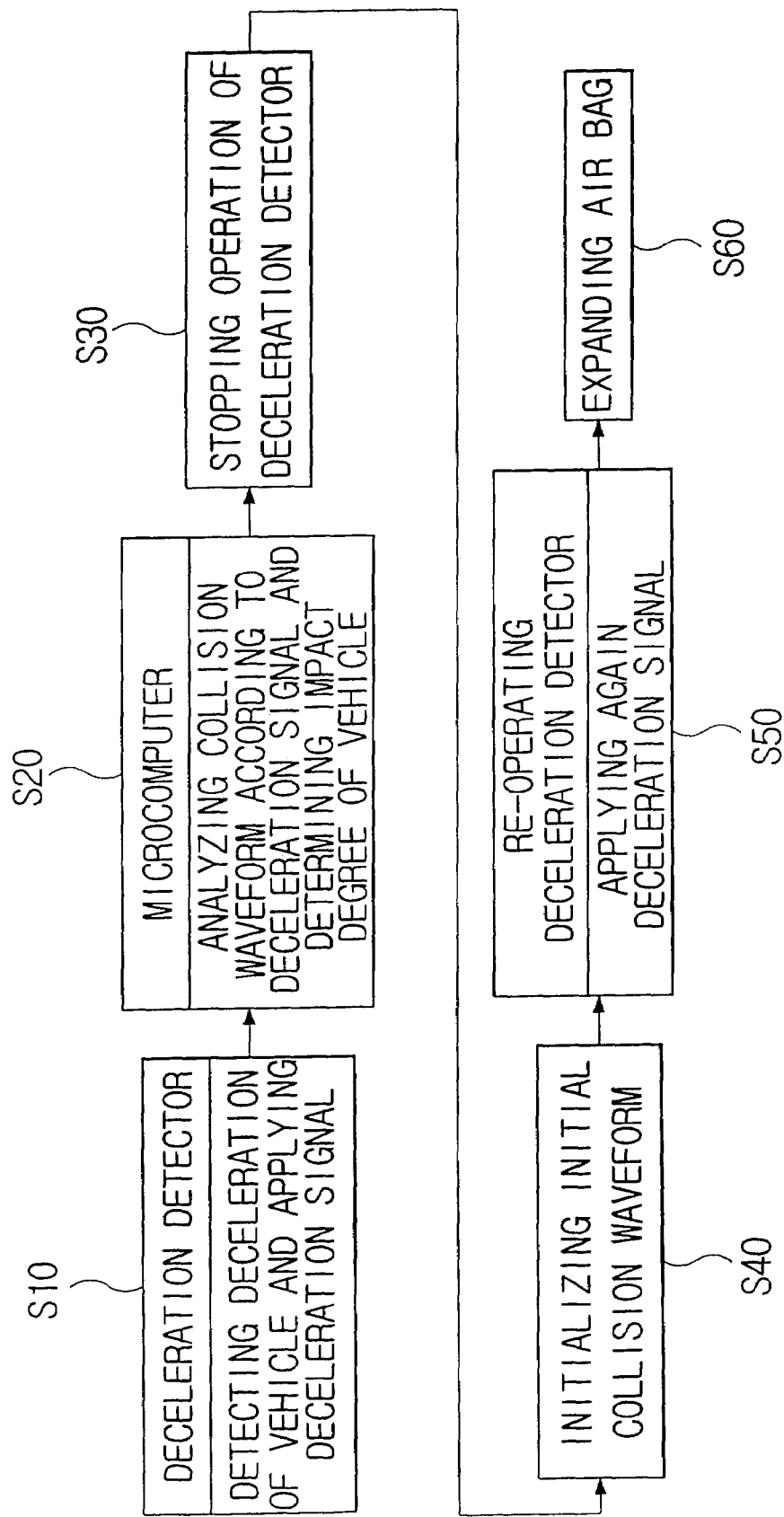
FIG. 1 is a flow chart illustrating an embodiment of the method for expansion of an air bag in accordance with the present invention.

As illustrated in FIG. 1, when a vehicle collides with another object, the deceleration detector detects a variation of the deceleration and applies the detected deceleration signal to a microcomputer, at step S10. As time passes, the deceleration of the vehicle gradually increases in the waveform. The microcomputer analyzes the inputted waveform to determine the degree of impact to the vehicle, at step S20. The microcomputer determines whether or not the collision waveform reaches a set time range after a predetermined time elapses from the initially recognized collision waveform. For example, if the initial moment when the deceleration of the vehicle is detected by the deceleration detector is considered to be 0 milliseconds (ms), it is desirable that the set time range be set to a range of 20–30 ms.

Next, if the collision waveform reaches a set time range following the initially recognized collision waveform by the microcomputer, the detecting operation of the deceleration detector is stopped, at step S30. Therefore, while the collision waveform is increasing, the microcomputer temporarily stops the operation of the deceleration detector. During the time that the operation of the deceleration detector is stopped, the microcomputer initializes an initially recognized collision waveform, at step S40. If the deceleration of the vehicle reaches a zero (0) velocity digit according to the initialization of the collision waveform, the microcomputer re-operates the deceleration detector. The deceleration of the vehicle is re-detected and the newly generated collision waveform is analyzed. Thus, the deceleration detector again detects the variation of the deceleration of the vehicle and applies the newly detected deceleration signal to the microcomputer, at step S50. The newly applied deceleration signal gradually increases in the waveform. Thereafter, if the collision waveform reaches a set value, the microcomputer operates the air bag driving unit to expand the air bag, at step S60.

According to a preferred embodiment of the present invention, the detecting operation of the deceleration detector is temporarily stopped after the vehicle collision begins, and the initially recognized collision waveform is initialized. Then, the deceleration detector re-operates and applies the newly detected deceleration signal to the microcomputer, thereby reducing the expansion time of the air bag. Accordingly, the expansion time of the air bag is closer to the RTTF, thereby achieving a more stable expansion performance of the air bag.

Figure 2:
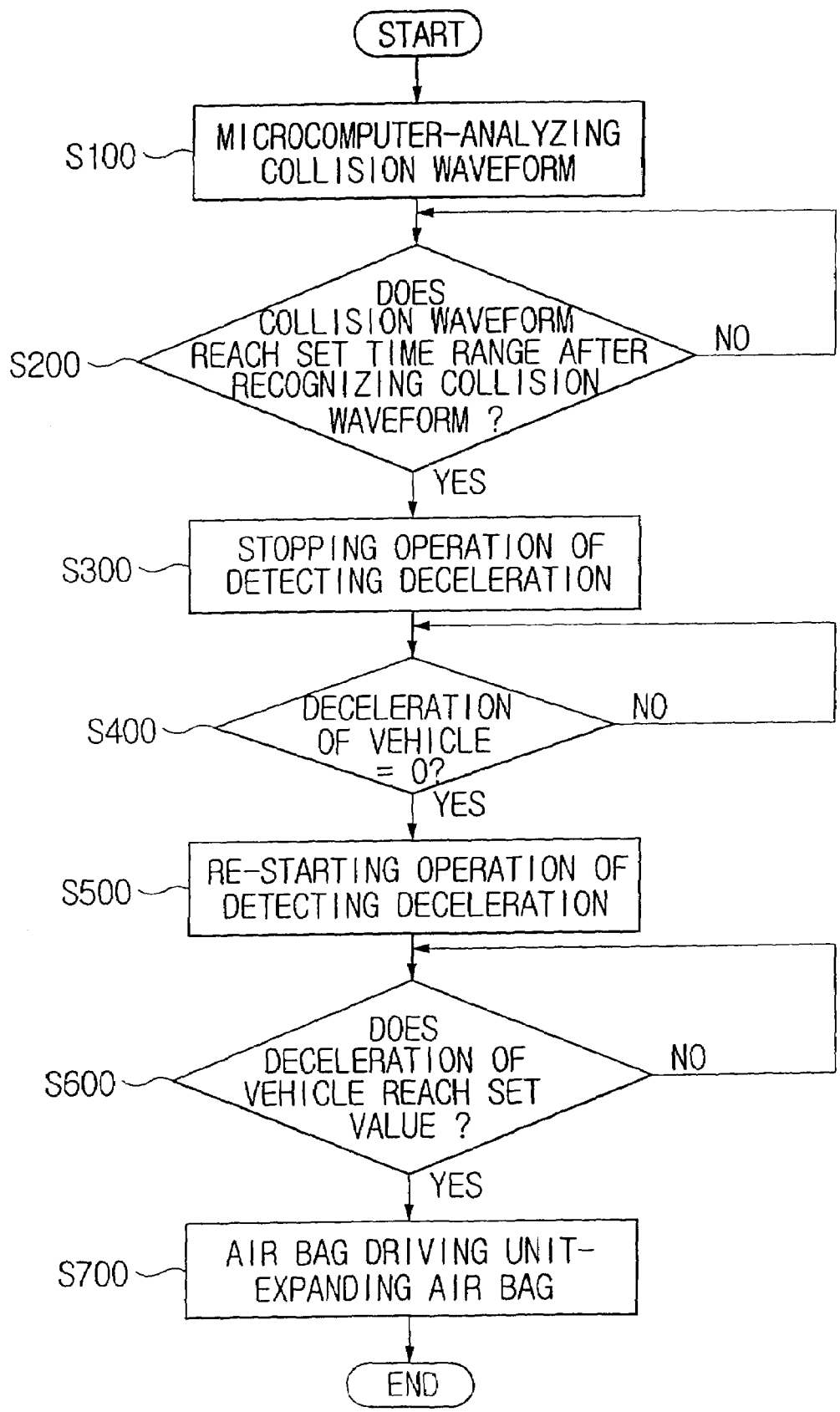
FIG. 2 is a flow chart illustrating another embodiment of the method for expansion of an air bag in accordance with the present invention.

Referring to FIG. 2, after the vehicle collision begins, the microcomputer recognizes and analyzes the collision waveform according to the deceleration of the vehicle and which is supplied from the deceleration detector, step S100. After a predetermined time elapses from when the microcomputer starts to recognize the initial collision waveform the microcomputer determines whether or not the collision waveform reaches a set time range, at step S200. In that case, if an initial moment when the deceleration of the vehicle is detected by the deceleration detector is considered to be 0 ms, it is desirable that the set time range be set to a range of 20 ms to 30 ms.

If the collision waveform reaches the set time range after the microcomputer starts to recognize the collision waveform, the detecting operation of the deceleration detector is stopped and the microcomputer initializes the initially recognized collision waveform, step S300.

After a predetermined time elapses, the microcomputer determines whether or not the vehicle's deceleration detected by the deceleration detector reaches a 0 velocity digit (1000 velocity digit=460G), at step S400.

If the vehicle's deceleration reaches a 0 velocity digit, the microcomputer reoperates the deceleration detector to restart the operation of detecting the deceleration of the vehicle according to the vehicle collision, at step S500.

Thereafter, the microcomputer analyzes the collision waveform according to the variation of the deceleration applied from the deceleration detector and determines whether or not the collision waveform reaches the set value, at step S600.

If the collision waveform reaches the set value, the microcomputer operates the air bag driving unit to expand the air bag, at step S700.

Figure 3:
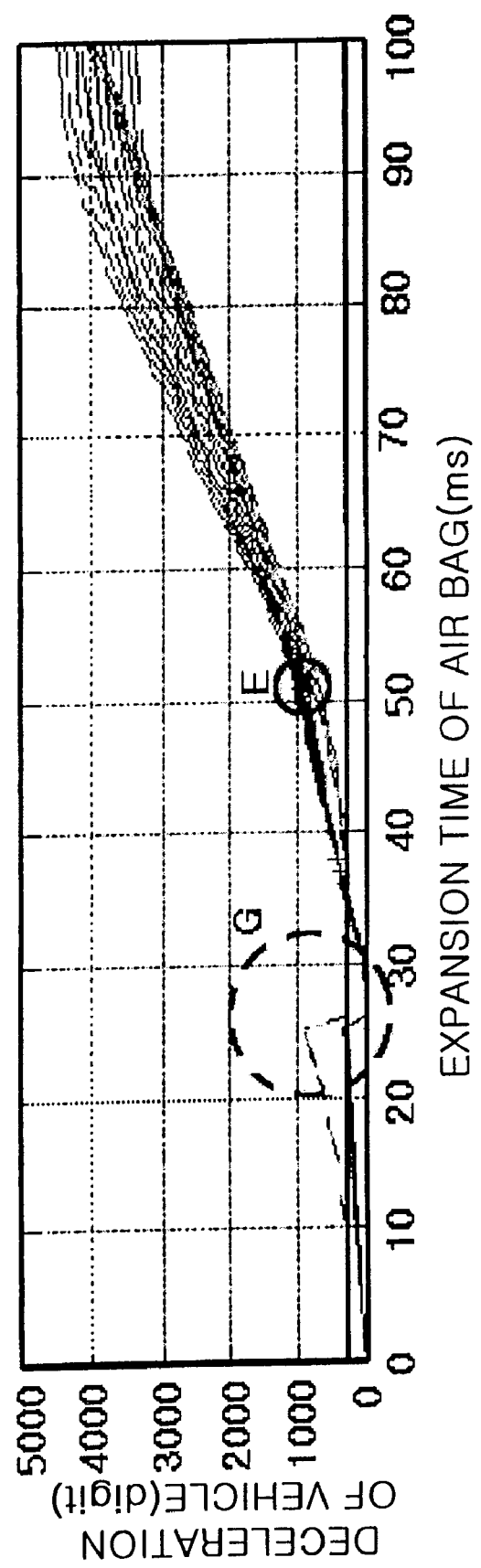
FIG. 3 is a graph showing a result obtained when the embodiment of the method of the present invention is carried out.

FIG. 3 is a graph showing an exemplary application of the method in accordance with the present invention, which illustrates a result obtained according to an embodiment of the method of the present invention carried out in case that the vehicle collides head-on with a pillar at a speed of 19 mph.

According to FIG. 3, each line on the graph represents an individual test. The minimum expansion time of the air bag is a point "E", corresponds to 50 ms, and the maximum expansion time of the air bag is 53 ms. The expansion time of the air bag according to the present invention is close to the RTTF at 50.2 ms. In FIG. 3, an reference symbol "G" shows that the collision waveform decreases when the operation of the deceleration detector is stopped within the set time range of 20 ms to 30 ms.

FIG. 4 is a graph showing another exemplary application of another embodiment of the method in accordance with the present invention, which illustrates a result obtained when the method of the present invention is carried out in the situation that the vehicle collides with a bus or a truck at a speed of 20 mph and is crushed under the bus or the truck.

According to FIG. 4, each line represents an individual test. The minimum expansion time of the air bag is shown at point "F", corresponding to 51 ms, and the maximum expansion time of the air bag is 53 ms. The expansion time of the air bag according to the present invention is close to the RTTF of 48.7 ms. In addition, the air bag system of the present invention is very stable since there is almost no variation in the expansion time of the air bag between tests. Reference symbol "H" shows that the collision waveform decreases when the operation of the deceleration detector is stopped within the set time range of 20 ms to 30 ms.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art. The scope of the present invention is intended to be defined by the appended claims and any equivalents granted thereto.

What is claimed is:

1. A method for controlling expansion of an air bag, the method comprising:
   (a) detecting a deceleration of a vehicle in a vehicle collision at a deceleration detector and applying the detected deceleration signal to a microcomputer;
   (b) analyzing a collision waveform generated according to the deceleration signal and determining an impact degree of the vehicle at the microcomputer;
   (c) temporarily stopping operation of the deceleration detector at the microcomputer while the deceleration of the vehicle is increasing;
   (d) initializing an initial collision waveform while the operation of the deceleration detector is stopped, the initial collision waveform being inputted before the microcomputer stops the operation of the deceleration detector;
   (e) re-operating the deceleration detector at the microcomputer, detecting again the deceleration of the vehicle at the deceleration detector, and applying the newly detected deceleration signal to the microcomputer to obtain a second collision waveform; and
   (f) when the second collision waveform reaches a first set value, operating an air bag driving unit at the microcomputer to thereby expand the air bag;
   whereby an expansion time of the air bag is controlled closely in conformance with a required time to fire (RTTF), thereby achieving a more stable expansion performance of the air bag.

2. The method according to claim 1, wherein the step (b) further includes the step of determining whether or not the collision waveform is higher than a second set value after a predetermined time elapses from a moment when the microcomputer starts to recognize the initial collision waveform.

3. The method according to claim 1 or 2, wherein the step (c) is carried out only if the collision waveform is higher than a second set value after a predetermined time elapses after the microcomputer starts to recognize the collision waveform.

4. The method according to claim 1, wherein the step (e) is carried out when the initial collision waveform reaches 0.

5. The method according to claim 2, wherein the predetermined time is 20 ms to 30 ms.

6. A method for controlling expansion of an air bag, comprising:
   detecting an initial deceleration signal of a vehicle from a deceleration detector during a vehicle collision;
   applying the initial deceleration signal to a microcomputer;
   analyzing the initial deceleration signal in the microcomputer;
   stopping operation of the deceleration detector;
   clearing the initial deceleration signal from the microcomputer;
   re-operating the deceleration detector to generate a new deceleration signal;
   applying the new deceleration signal to the microcomputer;
   analyzing the new deceleration signal in the microcomputer; and
   deploying an air bag if the new deceleration signal reaches a set value;
   whereby an expansion time of the air bag is controlled closely in conformance with a required time to fire (RTTF), thereby achieving a more stable expansion performance of the air bag.

7. The method of claim 6, where the initial deceleration signal is analyzed to determine if the initial deceleration signal reaches a set time range following a predetermined time lapse from the initial detection of deceleration.

8. The method of claim 7, wherein the set time range is between about 20 milliseconds and 30 milliseconds.

9. The method of claim 7, wherein the operation of the deceleration detector is stopped if the set time range is reached.

10. The method of claim 6, wherein the deceleration detector is reoperated if the deceleration of the vehicle reaches 0 g according to the initialization of the deceleration signal.

* * * * *